（12） United States Patent
Ziegler

(10) Patent No.: US 9,665,749 B2
(45) Date of Patent: *May 30, 2017

(54) PASSIVE TRANSPONDER WITH A CHARGING CIRCUIT

(71) Applicant: Atmel Corporation, San Jose, CA (US)

(72) Inventor: Werner Ziegler, Heilbronn (DE)

(73) Assignee: Atmel Corporation, San Jose, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/511,796

(22) Filed: Oct. 10, 2014

(65) Prior Publication Data

US 2015/0022322 A1    Jan. 22, 2015

Related U.S. Application Data

(63) Continuation of application No. 13/323,189, filed on Dec. 12, 2011, now Pat. No. 8,872,629.

(60) Provisional application No. 61/427,458, filed on Dec. 27, 2010.

(30) Foreign Application Priority Data

Dec. 27, 2010   (DE) .......................... 10 2010 056 031

(51) Int. Cl.
  *H04Q 5/22*   (2006.01)
  *G06K 7/10*   (2006.01)
  *G07C 9/00*   (2006.01)
  *H02J 5/00*   (2016.01)
(52) U.S. Cl.
  CPC ..... *G06K 7/10009* (2013.01); *G07C 9/00309* (2013.01); *H02J 5/005* (2013.01); *G07C 2009/00611* (2013.01)

(58) Field of Classification Search
  CPC ................ G06K 7/10009; H02J 5/005; G07C 2009/00611
  See application file for complete search history.

(56) References Cited

U.S. PATENT DOCUMENTS 4,238,697 A * 12/1980 Reddy ................... F02D 41/32
                                                123/478
5,105,190 A    4/1992 Kip et al.
5,241,160 A    8/1993 Bashan et al.
(Continued)

FOREIGN PATENT DOCUMENTS

DE    10 2005 015 594    10/2006
DE    10 2006 007 261     8/2007
EP       1 871 648 B1     9/2008

OTHER PUBLICATIONS

Office Action and English Translation for German Patent Application No. 10 2010 056 031.6, dated Feb. 29, 2012.
(Continued)

*Primary Examiner* — Omeed Alizada
(74) *Attorney, Agent, or Firm* — Fish & Richardson P.C.

(57) ABSTRACT

In one embodiment, a passive transponder comprising a first circuit comprising a first attenuator, the first circuit configured to receive a first signal from at least one base station and coupled to a first node, a first rectifier coupled to the first node, the first rectifier configured in a forward direction to charge a first capacitor, and the first capacitor coupled to the first rectifier, the first capacitor configured to receive a charge from the attenuator sufficient for powering the passive transponder.

20 Claims, 3 Drawing Sheets

(56) References Cited

U.S. PATENT DOCUMENTS

| | | | | |
|---|---|---|---|---|
| 5,418,706 | A * | 5/1995 | Havas | H05B 6/04 363/135 |
| 6,480,099 | B1 * | 11/2002 | Ziegler | G06K 19/0723 340/10.1 |
| 8,872,629 | B2 | 10/2014 | Ziegler | |
| 2003/0222756 | A1 * | 12/2003 | Shimonomoto | B60R 25/246 340/5.61 |
| 2006/0187049 | A1 | 8/2006 | Moser et al. | |
| 2006/0220786 | A1 * | 10/2006 | Hagl | B60R 25/24 340/5.61 |
| 2012/0161935 | A1 | 6/2012 | Ziegler | |

OTHER PUBLICATIONS

Weste, Neil H. E. et al., "Principles of CMOS VLSI Design," Addison, Wesley, (1985), p. 228.
Wikipedia, Radio-Frequency Identification (RFID), http://de.wikipedia.org/wiki/RFID; see also http://en.wikipedia.org/wild/RFID, Dec. 12, 2011.
Notice of allowance for U.S. Appl. No. 13/323,189 dated Jun. 24, 2014, 11 pages.
Notice of allowance for U.S. Appl. No. 13/323,189 dated Aug. 15, 2014, 9 pages.

* cited by examiner

PASSIVE TRANSPONDER WITH A CHARGING CIRCUIT

RELATED APPLICATIONS

This application is a continuation of U.S. application Ser. No. 13/323,189 filed on Dec. 12, 2011 which claims the benefit, under 35 U.S.C. §119(e), of U.S. Provisional Patent Application No. 61/427,458, entitled "Passive Transponder With a Charging Circuit and Method for Generating a Supply Voltage for a Passive Transponder," filed 27 Dec. 2010. This application also claims the benefit, under 35 U.S.C. §119(a), of German Patent Application No. 102010056031.6-35, entitled "Passiver Transponder mit Einer Ladeschaltung un Verfahren zur Erzeugung Einer Versorgungsspannung für Einen Passiven Transponder," filed 27 Dec. 2010.

TECHNICAL FIELD

This disclosure relates to transponders.

BACKGROUND

A transponder is a receiver-transmitter that will generate a reply signal upon proper electronic interrogation.

DESCRIPTION OF EXAMPLE EMBODIMENTS

Figure 1:
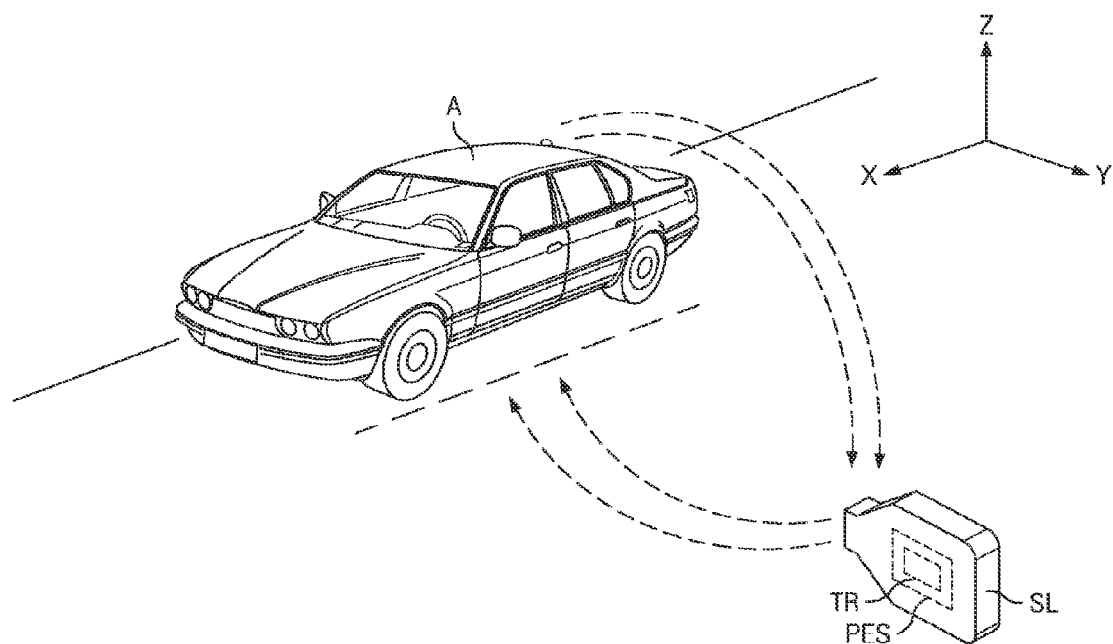
FIG. 1 shows an example passive transponder as part of a Passive Entry Go System with a circuit arrangement in a car key.

This disclosure relates to transponders.

European Patent No. EP 1 871 648 describes an inductively operating low-frequency (LF) transponder for a frequency range of 125 kHz. The LF transponder is subdivided into a battery-supported LF receiver, which has three parallel resonant circuits for reception in three spatial directions and a passively operating immobilizer key circuit, which shares one of the three parallel resonant circuits and in this way returns data with a base station. The immobilizer key circuit has only a small range and has a position-dependent range, which are detrimental. The receiver also requires a lot of current. Purely passive transponders are known from Wikipedia, RADIO-FREQUENCY IDENTIFICATION (RFID), http://de.wikipedia.org/wiki/RFID, which receives the necessary energy by means of absorption modulation from the field of the base station without battery support.

Particular embodiments provide a passive transponder that has a charging circuit for generating a supply voltage.

Particular embodiments provide a passive transponder with a charging circuit for a supply voltage capacitor. In particular embodiments, the passive transponder comprises a first parallel resonant circuit with a first coil and a first resonant circuit capacitor, wherein the first coil and the first resonant circuit capacitor are interconnected by a first node, a first rectifier, which is interconnected with the first node, and the supply voltage capacitor. In particular embodiments, the passive transponder comprises a second parallel resonant circuit with a second coil, which is essentially aligned orthogonally to the first coil, and a second resonant circuit capacitor. In particular embodiments, the second coil and the second resonant circuit capacitor are interconnected with a second node. In particular embodiments, a second rectifier is provided, which is interconnected with the second node and the supply voltage capacitor, and the second rectifier has the same forward direction as the first rectifier.

Particular embodiments provide a method for generating a supply voltage for a passive transponder, wherein two parallel resonant circuit branches connected in parallel with one another, which are respectively connected with a supply voltage capacitor by means of a rectifier, and the supply voltage capacitor is charged by means of an induced voltage in the parallel resonant circuits.

Passive transponders do not have their own battery-supported voltage supply. Particular embodiments provide a sufficient voltage supply for the operation of the transponder even with unfavorable alignment of the receiving circuit. In particular embodiments, absorption may be performed by coils. Thus, an inductive coupling, or a transformer coupling may be present in the near field of the base station. Such couplings may be used in frequency ranges below 5 MHz. By a parallel connection of at least two parallel resonant circuits that are essentially orthogonal in relation to each other and that mutually charge a supply voltage capacitor, the efficiency, and as a result the range, may be independent of the alignment of the antenna of the transponder with respect to the electromagnetic field radiated from the base station. In particular embodiments, the quality factor (Q-factor) of the parallel resonant circuits may be above 5 or over 10. Particular embodiments with a higher Q-factor increases the resonant circuit voltage so that, even with low field intensities of the absorbed electromagnetic field, the supply voltage capacitor may be adequately charged to supply the passive transponder with energy.

Particular embodiments provide a third parallel resonant circuit with a third coil, which is essentially aligned orthogonally to the second coil and essentially orthogonally to the first coil, and a third resonant circuit capacitor. In particular embodiments, the third coil and the third resonant circuit capacitor are interconnected with a third node. Particular embodiments provide a third rectifier that is interconnected with the third node and the supply voltage capacitor, and where the third rectifier has the same forward direction as the first rectifier. In particular embodiments, by means of three coils that are orthogonally aligned to one another, the absorption of energy from the electromagnetic field in any spatial position of the transponder is given, i.e., the supply of the passive transponder with energy is now virtually omnidirectional with respect to the direction of the emitted electromagnetic field.

In particular embodiments, a first modulation signal terminal is interconnected with the first node, and a second modulation signal terminal is interconnected with the second node of an immobilization unit. In particular embodiments, a third modulation signal terminal may be interconnected with the third node. In particular embodiments, modulated signals may be read by means of an immobilization unit from the parallel resonant circuits received on a carrier wave from a base station, within the scope of amplitude modulation. Moreover, amplitude modulation may be performed by means of the immobilization unit, which attenuates the respective resonant circuit. In particular embodiments, with an inductive coupling of transponder and base station, the transmitted signals of the transponder may be identified and read out as modulation of the carrier wave.

In particular embodiments, the resonance frequency of the parallel resonant circuits may be in a range of 20 kHz to 30 MHz. In particular embodiments, the resonance frequency of the parallel resonant circuits may be at 125 kHz. In particular embodiments, the resonance frequency of the parallel resonant circuits may be at 13 MHz. In particular embodiments, the resonance frequencies of the three parallel resonant circuits may be about the same.

In particular embodiments, each of the the first rectifier, the second rectifier, and the third rectifier may be an individual rectifier diode. By selecting the forward direction of the rectifier diodes such that the capacitor is only charged, but not discharged, decoupling between the parallel resonant circuits interconnected in the parallel circuit may be achieved. The supply voltage capacitor is thus charged from three parallel resonant circuits that are interconnected in parallel to each other, namely always from the parallel resonant circuit in which the induced voltage and/or half-wave is above the actual voltage of the charging capacitor.

Particular embodiments provide a control unit that maintains a functional connection to the immobilization unit. In particular embodiments, the control unit may be an integrated circuit that takes over the digital signal processing after analog signal processing is essentially performed in the transceiver. In particular embodiments, the control unit may be formed from the parallel resonant circuits and the modulator unit.

In particular embodiments, a switchable attenuator may be connected parallel to the resonant circuit capacitor in each parallel resonant circuit. The switchable attenuator may be connected with the immobilization unit and is additionally connected by the immobilization unit in order to increase the bandwidth of the individual parallel resonant circuit. In particular embodiments, during the transmission or reception of an amplitude-modulated carrier wave, an increase in the bandwidth and the reduced resonance step-up resulting therefrom may improve the detection of the modulation, and consequently, the data rate.

In particular embodiments, the attenuator may be a series circuit comprising a controllable switch, which may be a Metal Oxide Semiconductor (MOS) transistor and a resistor. In particular embodiments, the gate of the MOS transistor may be controlled by the immobilization unit. In particular embodiments, the attenuator may be a single MOS transistor.

In particular embodiments, parallel to each resonant circuit capacitor, a load modulation member may be a series circuit made from a controllable switch and a Zener diode. In particular embodiments of the Zener diode, practically no current flows below the breakdown voltage, and an applied voltage above the breakdown voltage may be clamped virtually, independent of the current flow to the value of the breakdown voltage. In this way, each parallel attenuation circuit may be attenuated as load modulation to the breakdown voltage of the Zener diode.

In particular embodiments, the respective rectifier of each parallel attenuation circuit may be a controllable rectifier unit. The control input of the controllable rectifier unit is interconnected with the immobilization unit. In particular embodiments, the charging of the supply voltage capacitor may be controlled by means of the immobilization unit.

It should be noted that in particular embodiments the energy supply of the transponder occurs exclusively by means of absorption modulation, and that no battery-supported supply voltage is provided for the transponder. In particular embodiments, the transponder may be used within a fail-safe Passive Entry Go System for a car key. By virtue of the fact that no battery voltage is required, the car may be opened at any time even if the battery of the car key is empty, as long as the key is within a close vicinity of the base station of the car and absorbs sufficient energy from the field of the base station.

FIG. 1 shows an example passive transponder TR as part of a Passive Entry Go System PES in a car key SL. The car key SL is located within the field of the base station of a car A. In particular embodiments, the transponder TR may be inductively coupled, such as by means of a coil, to the electromagnetic field of one or more base stations within the car. In particular embodiments, the potential spatial positions of the TR transponder with respect to the car include the three spatial directions of the Cartesian coordinate system.

Figure 2:
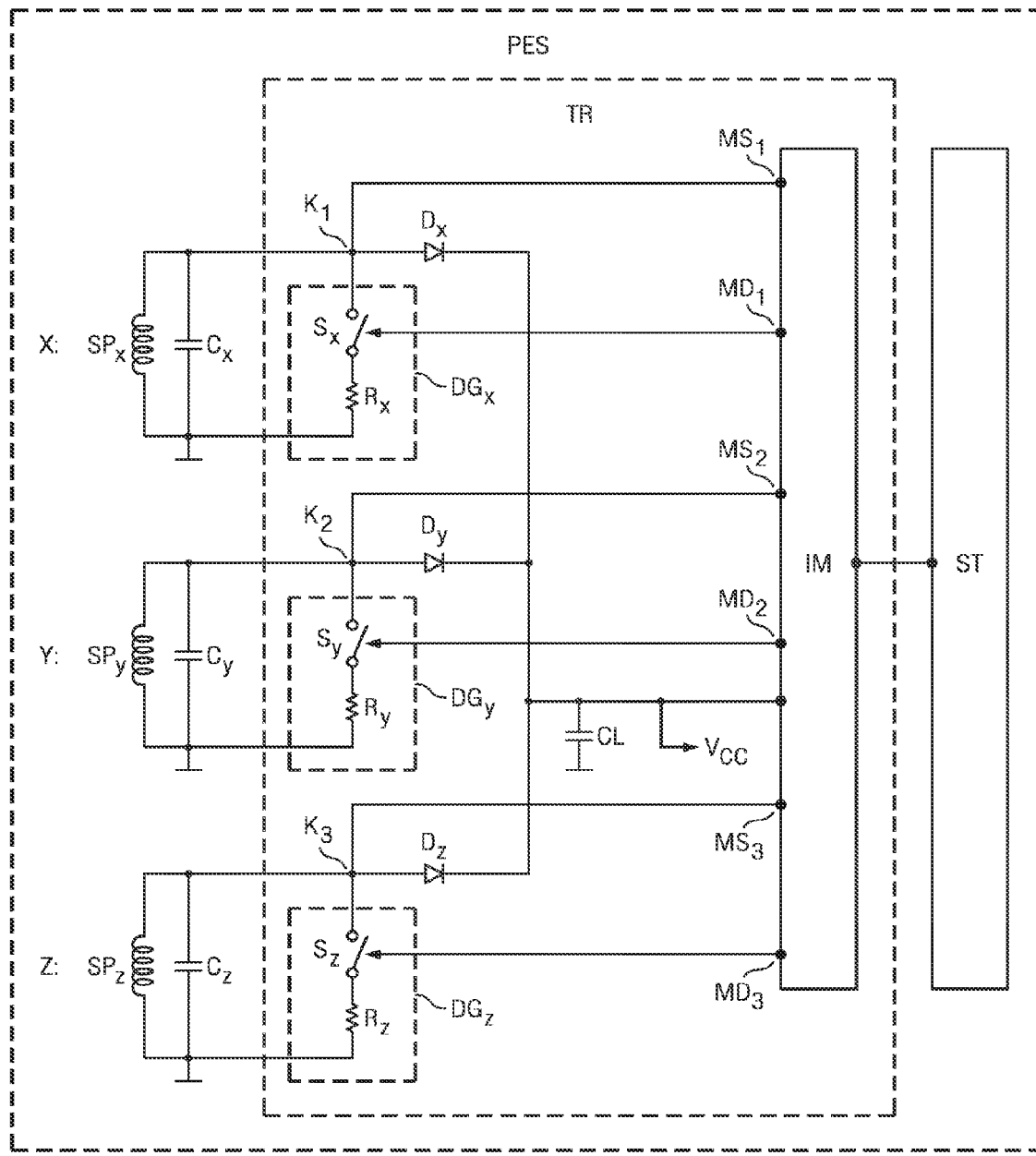
FIG. 2 shows an example embodiment of a circuit.

FIG. 2 shows an embodiment of an example circuit arrangement of the transponder TR as part of the Passive Entry Go System PES. In particular embodiments, the first parallel attenuation circuit has a first coil SPx, a first resonant circuit capacitor Cx connected in parallel with the first coil SPx, and an attenuator DGx connected in parallel with the first resonant circuit capacitor Cx. The attenuator DGx comprises a series circuit comprising a first switch Sx with a control input and a first resistor Rx. The first coil SPx, the first resonant circuit capacitor Cx and the first switch Sx may be interconnected with a first node K1. In particular embodiments, a first connection $MS_1$ of an immobilization unit IM and the anode of a first rectifier diode Dx is interconnected with the first node K1. The cathode of the first rectifier diode Dx is further connected with a supply voltage capacitor CL, which is interconnected with a reference potential. In particular embodiments, the first coil SPx, the first resonant circuit capacitor Cx, and the first resistor Rx may also interconnected with the reference potential. In particular embodiments, the control input of the first switch Sx is interconnected with a first gate terminal $MD_1$ of the immobilization unit IM. In particular embodiments, the immobilization unit IM is interconnected with a control unit ST.

In particular embodiments, the second parallel attenuation circuit has a second coil SPy, a second resonant circuit capacitor Cy that is connected in parallel with the second coil SPy, and an attenuator DGy connected in parallel with the second resonant circuit capacitor Cy. In particular embodiments, the attenuator DGy comprises a series circuit comprising a second switch Sy with a control input and a second resistor Ry. The second coil SPy, the second resonant circuit capacitor Cy, and the second switch Sy may be interconnected with a second node K2. In particular embodiments, a second connection $MS_2$ of the immobilization unit IM and the anode of a second rectifier diode Dy is interconnected with the second node K2. The cathode of the second rectifier diode Dy is further connected with the supply voltage capacitor CL, which is interconnected with a reference potential. In particular embodiments, the second coil SPy, the second resonant circuit capacitor Cy, and the second resistor Ry may also be interconnected with the reference potential. In particular embodiments, the control input of the second switch Sy is interconnected with a second gate terminal $MD_2$ of the immobilization unit.

In particular embodiments, the third parallel attenuation circuit has a third coil SPz, a third resonant circuit capacitor Cz that is connected in parallel with the third coil SPz, and an attenuator DGz connected in parallel with the third resonant circuit capacitor Cz. In particular embodiments, the attenuator DGz comprises a series circuit comprising a third switch Sz with a control input and a third resistor Rz. The third coil SPz, the third resonant circuit capacitor Cz, and the third switch Sz may be interconnected with a third node K3.

In particular embodiments, a third connection $MS_3$ of the immobilization unit IM and the anode of a third rectifier diode Dz is interconnected with the third node K3. The cathode of the third rectifier diode Dz is further connected with the supply voltage capacitor CL, which is interconnected with a reference potential. In particular embodiments, the third coil SPz, the third resonant circuit capacitor Cz, and the third resistor Rz may also be interconnected with the reference potential. In particular embodiments, the control input of the third switch Sz is interconnected with a third gate terminal $MD_3$ of the immobilization unit IM.

Particular embodiments provide three parallel attenuation circuits, the first parallel attenuation circuit for the X spatial direction, the second parallel attenuation circuit for the Y spatial direction, and the third parallel attenuation circuit for the Z spatial direction, wherein at least the coil of the respective parallel attenuation circuit is aligned in the associated spatial direction X, Y, or Z. In particular embodiments, the supply voltage capacitor CL is charged with all three parallel attenuation circuits via the rectifier diodes Dx, Dy, and Dz. As a result thereof, in the event that a voltage is induced in all three coils, just one part of the induced half-wave of the respective resonant circuit charges the supply voltage capacitor CL which represents the highest voltage in the resonant circuit compared to the half-wave parts of the two other parallel attenuation circuits. In particular embodiments, the Q-factor of the parallel resonant circuits may be above 10 in order for a resonant circuit voltage that is as high as possible and forming a supply voltage as a result, even if the induction is low. As the Q-factor increases, the bandwidth for the data transfer of the immobilization unit to and from the base station drops, in that the separation and preparation of modulated signals on the carrier wave may become difficult. In particular embodiments, an attenuator may be connected by means of a controller by the immobilization unit at least in one of the parallel attenuation circuits, in order to increase the bandwidth for data transfer. In particular embodiments, an attenuator may be connected by means of a controller by the immobilization unit in all parallel attenuation circuits.

Figure 3:
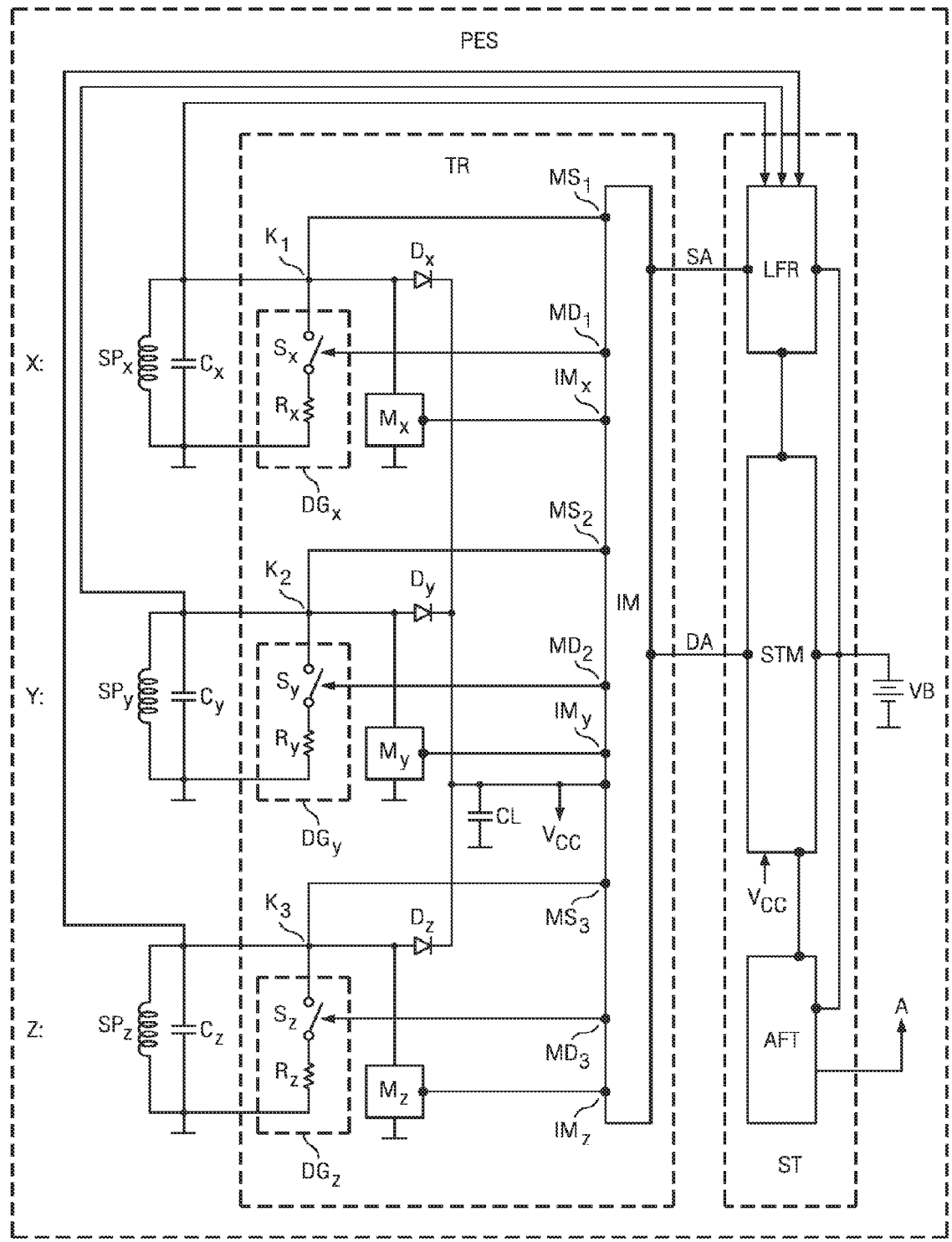
FIG. 3 shows another example embodiment of a circuit.

FIG. 3 shows another example circuit arrangement of the transponder TR as part of a Passive Entry Go System PES. In the following, only the differences within the scope of the example embodiment described in FIG. 2 are mentioned. In particular embodiments, the first parallel attenuation circuit has a load modulation element Mx that is connected in parallel with the first resonant circuit capacitor Cx. In particular embodiments, the first load modulation element Mx consists of a series circuit comprising a Zener diode and a controllable switch (not shown). The control input of the controllable switch is interconnected with a first modulation gate terminal IMX of the immobilization unit IM. In particular embodiments, practically no current flows below the breakdown voltage in the Zener diode, and an applied voltage above the breakdown voltage is clamped virtually independently of the current flow to the value of the breakdown voltage. In this way, each parallel resonant circuit may be attenuated as load modulation to the breakdown voltage of the Zener diode.

The second parallel resonant circuit further has a load modulation element My that is connected in parallel with the second resonant circuit capacitor Cy. In particular embodiments, the third load modulation element My consists of a series circuit comprising a Zener diode and a controllable switch. The control input of the controllable switch is interconnected with a second modulation gate terminal IMY of the immobilization unit IM.

The third parallel resonant circuit moreover has a load modulation element Mz that is connected in parallel with the third resonant circuit capacitor Cz. In particular embodiments, the third load modulation element Mz consists of a series circuit comprising a Zener diode and a controllable switch. The control input of the controllable switch is interconnected with a third modulation gate terminal IMZ of the immobilization unit IM.

The first parallel resonant circuit, as well as the second parallel resonant circuit and the third parallel resonant circuit are respectively interconnected with an input of an LF receiver unit LFR. In particular embodiments, the LF receiver unit LFR may be interconnected with the immobilization unit IM by means of a line SA.

In particular embodiments, the LF receiver unit LFR is further interconnected with a microprocessor-supported control unit STM. The control unit STM is interconnected with an UHF transmitter unit RFT, which has an HF antenna A, and with the immobilization unit IM by means of a line DA. In particular embodiments, the control unit STM, LF receiver unit LFR, and the UHF transmitter unit RFT, may be a part of the control unit ST. In contrast to the transponder TR, the control unit STM, LF receiver unit LFR, and the UHF transmitter unit RFT, are interconnected with a battery VB. In particular embodiments, the supply voltage capacitor CL is interconnected with the control unit STM. It should be noted that frequencies above 100 MHz are presently designated as UHF.

If a sufficient supply voltage is generated by means of the absorption modulation, the control unit STM may be supplied by means of this energy, which may reduce the energy withdrawal from the battery VB. By virtue of the fact that the individual parallel resonant circuits are interconnected both with the immobilization unit IM as well as with the LF receiver unit LFR, the parallel resonant circuits may be used both for receiving data for the LF receiver unit LFR and for the reception and transmission of data from the immobilization unit IM. In particular embodiments, the control, such as a sequential utilization of the parallel resonant circuits either for the immobilization unit IM or for the LF receiver unit LFR, is performed by means of the line SA. When data is received that is for the LF receiver unit LFR, the attenuators DGx, DGy, DGz may be connected additionally by means of the immobilization unit IM, in order to increase the bandwidth. This makes it possible to increase the data rate. By means of the attenuators DGx, DGy, DGz, the Q-factor, which may be in a range about 10 to 20, may be reduced to a range below 10.

The example embodiments shown are mainly schematic, that is, the distances and the lateral and vertical dimensional ranges may not be to scale and also may not have any derivable geometrical relation to each other unless stated otherwise.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
 a first resonant circuit including a first coil and a first resonant capacitor interconnected by a first node;
 a second resonant circuit including a second coil and a second resonant capacitor interconnected by a second node;
 a third resonant circuit including a third coil and a third resonant capacitor interconnected by a third node;
 a passive transponder coupled to the first, second and third resonant circuits, the passive transponder including:
 a first attenuator coupled to the first resonant circuit, the first attenuator operable to adjust a first bandwidth of the first resonant circuit;
 a second attenuator coupled to the second resonant circuit, the second attenuator operable to adjust a second bandwidth of the second resonant circuit;
 a third attenuator coupled to the third resonant circuit, the third attenuator operable to adjust a third bandwidth of the third resonant circuit; and
 a control circuit operable to control the first, second and third attenuators.

2. The system of claim 1, further comprising:
 a supply voltage capacitor coupled to the first, second and third nodes and to the control circuit, the supply voltage capacitor operable to provide a supply voltage at least to the control circuit.

3. The system of claim 2, further comprises:
 a first rectifier coupled to the first node and the supply voltage capacitor;
 a second rectifier coupled to the second node and the supply voltage capacitor; and
 a third rectifier coupled to the third node and the supply voltage capacitor.

4. The system of claim 3, wherein the supply voltage capacitor is charged by the first, second and third attenuators through the first, second and third rectifiers, respectively.

5. The system of claim 1, further comprising:
 a first load modulation element coupled to the first node and the control circuit;
 a second load modulation element coupled to the second node and the control circuit; and
 a third load modulation element coupled to the third node and the control circuit.

6. The system of claim 5, wherein at least one of the first, second or third load modulation elements includes a switch in series with a Zener diode, where the switch is controlled by the control circuit.

7. The system of claim 1, further comprising:
 a radio frequency receiver coupled to the control circuit and to the first, second and third resonant circuits.

8. The system of claim 7, further comprising:
 a microprocessor coupled to the control circuit and the radio frequency receiver.

9. The system of claim 8, wherein the microprocessor is coupled to a battery.

10. The system of claim 1, wherein the system is a passive entry system and the control circuit is an immobilization unit.

11. The system of claim 1, wherein the control circuit is configured to sequentially utilize the first, second and third resonant circuits.

12. The system of claim 1, wherein the first, second and third coils are coupled in parallel with the first, second and third resonant capacitors, respectively.

13. The system of claim 1, wherein at least one of the first, second or third attenuators includes a switch coupled in series with a resistor.

14. The system of claim 1, wherein at least one of the first, second or third resonant circuits has a resonant frequency in a range of about 20 kHz to about 30 MHz.

15. The system of claim 1, wherein a resonant frequency of at least two of the first, second or third resonant circuits is about the same.

16. The system of claim 1, wherein at least one of the first, second or third resonant circuits has a Q-factor that is greater than or equal to 5.

17. The system of claim 1, wherein at least two of the first, second or third coils are aligned orthogonally.

18. The system of claim 1, wherein the control circuit is operable to read modulated signals from the first, second and third resonant circuits.

19. The system of claim 3, wherein at least one of the first, second or third rectifier is a diode.

20. The system of claim 13, wherein the switch is controlled by the control circuit.

* * * * *